United States Patent
Allen

(10) Patent No.: US 10,089,373 B1
(45) Date of Patent: Oct. 2, 2018

(54) WIDE-SCALE REPLICATION OF SIMILARLY STRUCTURED DATA

(75) Inventor: Nicholas Alexander Allen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 221 days.

(21) Appl. No.: 13/350,495

(22) Filed: Jan. 13, 2012

(51) Int. Cl.
*G06F 7/00* (2006.01)
*G06F 17/00* (2006.01)
*G06F 17/30* (2006.01)
*G06F 13/14* (2006.01)

(52) U.S. Cl.
CPC .............. *G06F 17/30575* (2013.01)

(58) Field of Classification Search
CPC ........... G06F 11/1451; G06F 17/30067; G06F 17/30212; G06F 11/1469; G06F 11/2082; G06F 11/1402; G06F 17/30008; G06F 17/30575; G06F 2221/0782; G06F 17/30215
USPC ... 707/610, 624, 769, 999.01, 999.204, 654, 707/674, 620, 640, 622, 637, E17.01, 707/999.101, 635, 638, 646; 709/203; 726/7; 714/5.1, 6.2
See application file for complete search history.

(56) References Cited

U.S. PATENT DOCUMENTS

| | | | |
|---|---|---|---|
| 7,653,668 B1 * | 1/2010 | Shelat et al. | 707/610 |
| 8,171,337 B2 * | 5/2012 | Peters et al. | 714/6.2 |
| 2010/0269164 A1 * | 10/2010 | Sosnosky et al. | 726/7 |
| 2011/0072073 A1 | 3/2011 | Curtis | |

OTHER PUBLICATIONS

Brian Adler, "Building Scalable Applications In the Cloud: Reference Architecture and Best Practices", Right Scale, Inc., 2011, pp. 1-20.
"The Definitive Guide to Cloud Portfolio Management", Right Scale, Inc., Retrieved from URL: https://forum.equinix.com/insights/definitive-guide-to-cloud-portfolio-management/cloud-it-services, 2014, pp. 1-15.
Right Scale, URL: http://www.rightscale.com/, Retrieved on Mar. 29, 2016, pp. 1-3.
"Digital Campaign Technology Guide: Avoid Success Disaster by Leveraging Cloud Infrastructure for Your Holiday Campaigns", Right Scale, Inc., 2013, pp. 1-7.

* cited by examiner

*Primary Examiner* — Syling Yen
*Assistant Examiner* — Cecile Vo
(74) *Attorney, Agent, or Firm* — Robert C. Kowert; Meyertons, Hood, Kivlin, Kowert & Goetzel, P.C.

(57) ABSTRACT

A service metadata replication system includes an ingester that scrapes or receives service data including metadata values for service objects from various services. The ingester formats the metadata values for storage in a service store. The service store can asynchronously replicate a portion of the metadata values through a write intake to a storage cluster. In addition, an inter-regional replicator asynchronously replicates one or more additional metadata values to the storage cluster from another service instance that is remotely located. An authorization runtime scrapes or receives security information regarding the service instance. A query processor can issue a query request for a portion of the metadata values and a portion of the additional metadata values to a read intake. The read intake can then satisfy the query request based on the contents of the authorization runtime and storage cluster.

27 Claims, 6 Drawing Sheets

WIDE-SCALE REPLICATION OF SIMILARLY STRUCTURED DATA

BACKGROUND

Software services and Web services provide a way to access software functionality that can be reused for a variety of purposes by different clients. Services are usually provided by a server or other entity and are accessed by clients remotely over a network connection, such as a local area network (LAN) or a wide area network (WAN).

Services often manage objects on behalf of a user or client. Each of these objects can be associated with metadata values that describe the object and may provide information about accessing the service. A service may offer a query application programming interface (API) that can be used by users to obtain these metadata values.

In certain situations, a user may need to access a large number of services to obtain metadata about their various objects. In these instances, querying across dozens or possibly hundreds of geographically distributed services may introduce impractical latencies required to create many network connections and aggregate the resulting responses. As such, direct query of widely distributed services is not always a scalable approach for users interacting with large number of services.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments overcome the aforementioned and other deficiencies in existing approaches for storing and accessing data, such as service metadata. In particular, various embodiments provide approaches to replicating service metadata in a scalable manner on a wide scale and enabling that metadata to be available to clients for query access.

In accordance with various embodiments, a service metadata replication system is described. The system includes an ingester that scrapes or receives service data comprising one or more metadata values for service objects from a service instance. In accordance with various embodiments, an ingester can be implemented as a module, application, service, or other component provided as software, hardware, or any combination thereof. The metadata values scraped by the ingester can describe the service, such as its various operations, the parameters that those operations may require, return types and the like. The ingester can format the metadata values for storage in a service store. The service store can asynchronously replicate a portion of the metadata values through a write intake to a storage cluster. In addition, an inter-regional replicator can asynchronously replicate one or more additional metadata values to the storage cluster from another service instance that may be remotely located.

In accordance with an embodiment, the system further includes an authorization runtime that can scrape or receive security information regarding the service instance. Further, a query processor can issue a query request for a portion of the metadata values and a portion of the additional metadata values to a read intake. The read intake can then satisfy the query request based on the contents of the authorization runtime and storage cluster. In this manner similarly structured data from a plurality of services may be replicated to support querying metadata values from the services with low latency.

Figure 1:
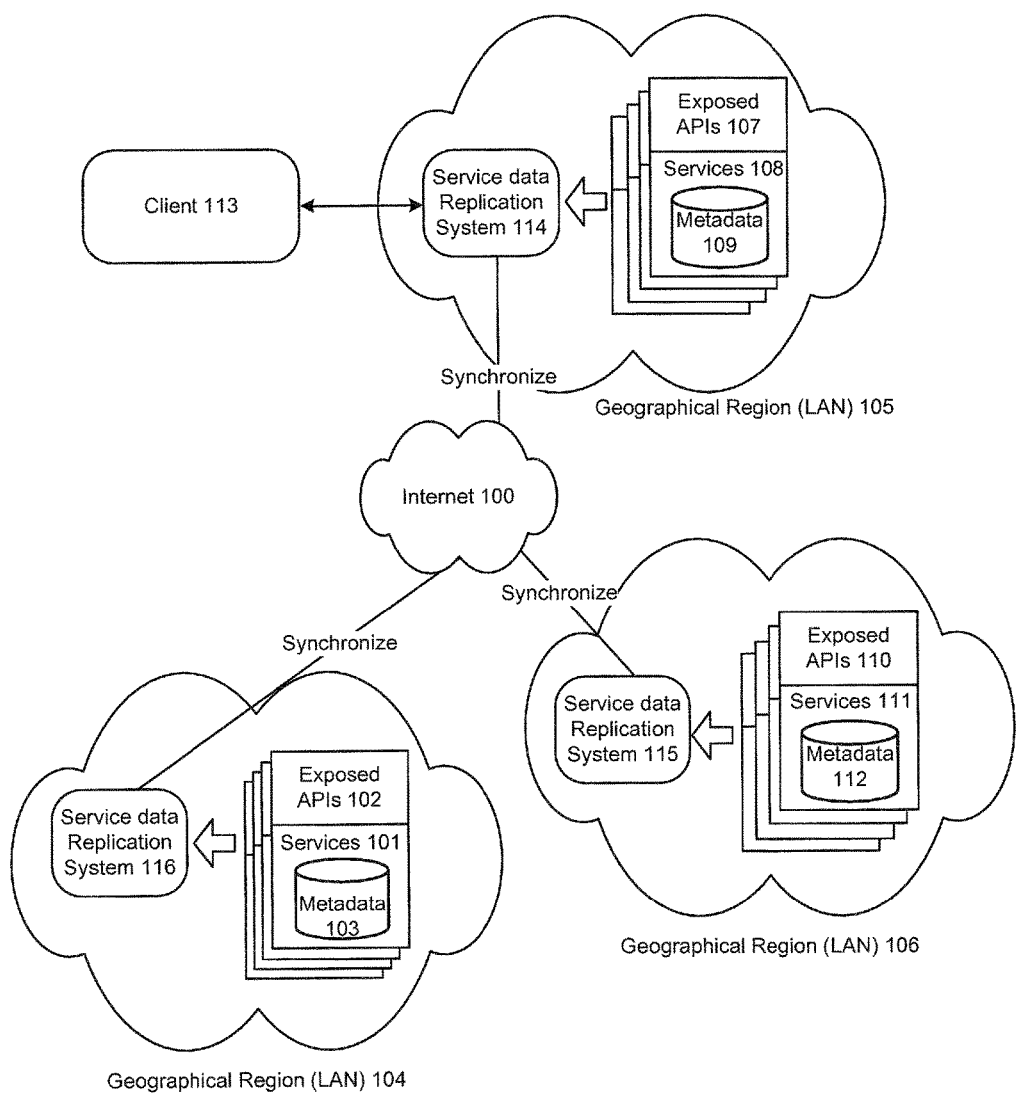
FIG. 1 illustrates an example of a possible deployment of the service data replication system in accordance with various embodiments.

FIG. 1 illustrates an example of a possible deployment of the service data replication system in accordance with various embodiments. As illustrated, certain network accessible service providers can operate their services at large volumes and on a global scale. It can be valuable for these service providers to segregate various sets of services in discrete regions (e.g. geographical deployments, clusters, LANs etc.) for reasons of ease of use and clear boundaries for fault isolation. At the same time, however, it can be advantageous for clients of such service providers to view their applications in a holistic fashion without regard to their physical location. As the scale of network accessible services and applications increase, the value of being able to efficiently query across widely-distributed service data similarly increases.

In this particular illustration, a service provider can deploy services in a multitude of regions (104, 105, 106) that each can take the form of a local area network (LAN). Each region can host a number of services (101, 108, 111) that have associated metadata (103, 109, 112) that describe the objects of those services. The services also expose application programming interfaces (APIs) (102, 107, 110) for accessing the metadata of each service.

In accordance with an embodiment, the service provider (or a third party) can deploy the service data replication system (114, 115, 116) at each geographical region. The system can be used to collect the service metadata at each region and to replicate that metadata to other regions over the Internet 100 or other remote connection. Thereafter, the local metadata, as well as metadata from other regions can be locally available to clients 113 for query.

Figure 2:
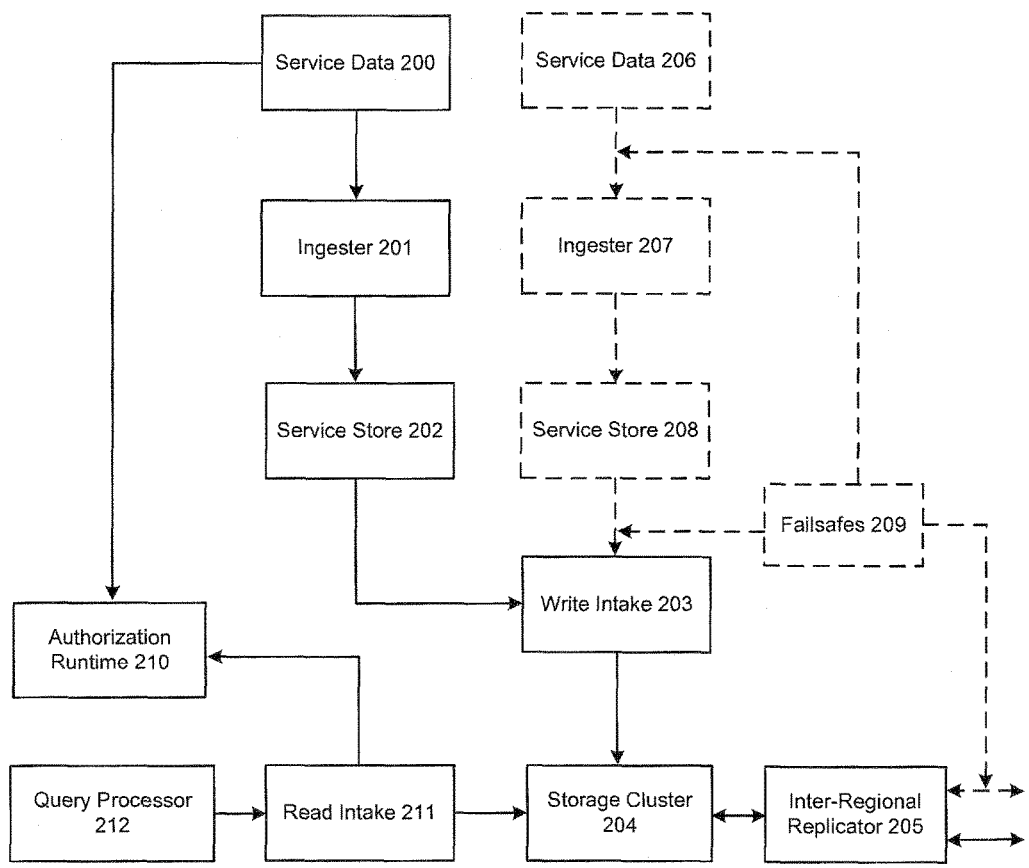
FIG. 2 illustrates an example of the various components of the service data replication system, in accordance with various embodiments.

FIG. 2 illustrates an example of the various components of the service data replication system, in accordance with various embodiments. As illustrated, service data 200 can comprise one or more metadata values for service objects. In accordance with an embodiment, these metadata values can be implemented as key-value pairs, with the keys being drawn from a particular namespace and the values comprising a set of strings, integers or other data. In alternative embodiments, the metadata values can be implemented as various other constructs, such as data records in a database, extensible markup language (XML) files, web services description language (WSDL) files and the like. The ingester 201 can be configured to scrape or receive metadata values from a local service instance. A service store 202 can store metadata values from an ingester and offer to replicate changes to the metadata values. A write intake 203 can perform bulk replication of changes to the metadata in a single direction from one store 202 of metadata values to another 204 across a reliable local area network (LAN) or high-speed interconnect. An inter-regional replicator 205 can perform bulk replication of changes bi-directionally from one store of metadata values to another remotely located store across an unreliable WAN interconnect. In accordance with various embodiments, the inter-regional replicator 205 can be implemented as a module, application, service, or other component provided as software, hardware, or any combination thereof.

An authorization runtime 210 can scrape or receive security information and can evaluate security requests regarding access of metadata values. A query processor 212 can receive and perform query requests for metadata values from various clients. A read intake 211 can provide metadata values to satisfy query requests.

In accordance with various embodiments, the system can also be used to ingest and normalize the service metadata across a plurality of separate and independent services. For example, as illustrated in FIG. 2, the service data 206 associated with a second service instance can be ingested by ingester 207 and stored into service store 208. Upon writing the service metadata, the ingester 207 can also format (normalize) the data 206 such that it can be more similarly structured and accessible with service data 200.

In addition, a failsafe decoupler 209 can be included in the system in order to prevent any errors from having a cascading effect in the system. In accordance with an embodiment, the failsafe decoupler can automatically engage when an error is detected in a particular component and temporarily suspend any writes from that component to other components in the system. For example, if a consistency error is detected in the service store 208, the failsafe 209 can temporarily suspend the write intake from propagating data from the service store 208 to the storage cluster 204. Once the error has been addressed, the failsafe can effectively disengage, allowing the writing and propagation of service data to resume.

Figure 3:
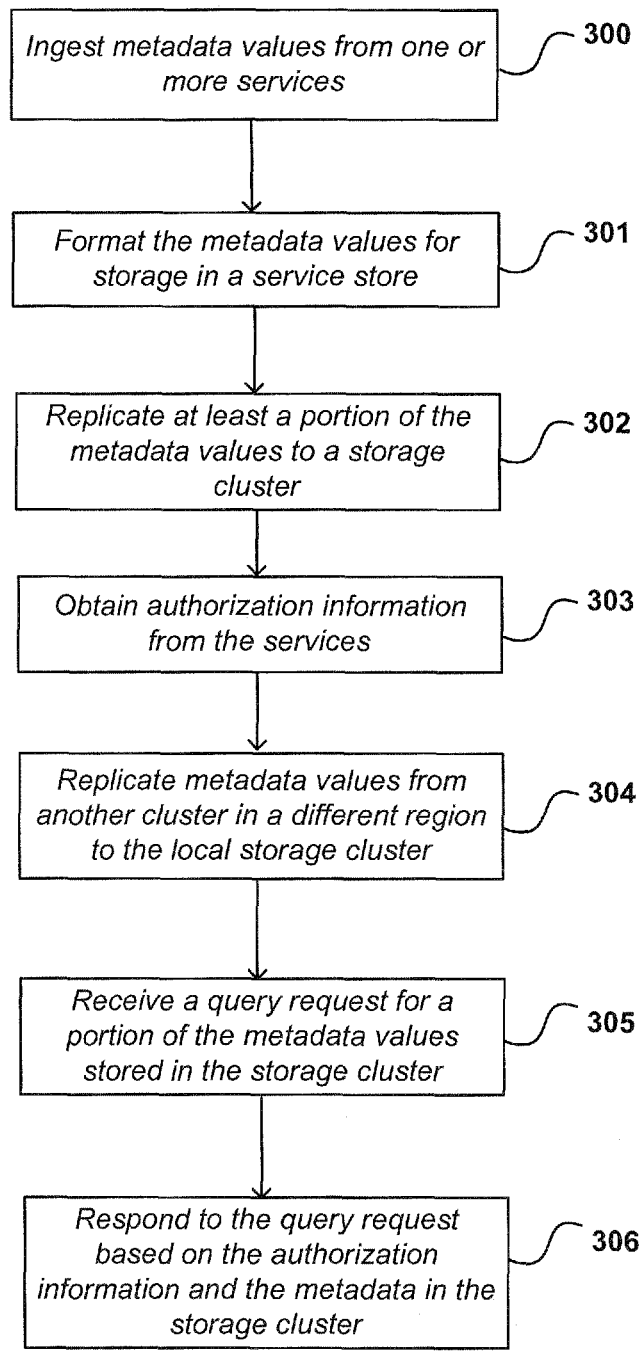
FIG. 3 illustrates an example process that can be used to perform wide-scale replication of similarly structured data from a plurality of services to satisfy queries, in accordance with various embodiments.

FIG. 3 illustrates an example process that can be used to perform wide-scale replication of similarly structured data from a plurality of services to satisfy queries, in accordance with various embodiments. Although this figure, as well as other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

As illustrated in step 300, service metadata can be ingested from one or more services. This can be performed by an ingester component that scrapes or receives service data comprising one or more metadata values for service objects from a service instance.

In accordance with some embodiments the ingester can be configured to scrape a service for metadata values by periodically, for example hourly, making calls on behalf of a number of users to retrieve metadata values for service objects. The use of scraping may be used to provide compatibility with existing services that are unaware of the ingester.

In accordance with alternative embodiments the ingester can be configured to operate a web service endpoint that a service periodically calls providing a list of changes to metadata values. The use of an endpoint can be used to provide bulk data transfers for services that are able to coordinate changes with the ingester. The use of bulk data transfers may provide benefits such as allowing the ingester to receive updates for more users more quickly than by scraping.

In accordance with other embodiments, the ingester can combine a mix of these approaches. For example, the ingester can be configured to operate a web service endpoint for a first service that supports a bulk transfer mechanism and can be configured to scrape a second service that does not support a bulk transfer mechanism.

As illustrated in step 301, the ingester can format the metadata values for storage in a service store. The service store can be organized as a hierarchical data store, relational database, key-value data store, or other means of storing the formatted metadata values.

In accordance with an embodiment, the ingester can format the metadata values to be more similarly structured with other metadata values. For example, if a query is being made available across multiple services and multiple service regions, then the ingester may format the metadata values to hierarchically organize the data according to: the identity of the user that owns the service objects, the region that the service instance resides in, and the name of the service.

In accordance with an embodiment, the ingester can format the metadata values so as to organize them in a standard manner. For example, the ingester can format the metadata values to conform to a directory layout or to a key-value format that follows a specific schema.

The ingester can perform data type conversion, such as by converting dates to a coordinated universal time (UTC) time or such as by converting a fixed-point number to a double-precision floating point number. The ingester can perform schema normalization, such as by renaming metadata values to follow a particular naming convention or by dropping metadata values not supported by the schema.

In step 302, a portion of the metadata values are asynchronously replicated to a storage cluster. In accordance with an embodiment, the service store replicates the values through a write intake to the storage cluster. The service store can calculate an incremental difference of metadata values that have been written since the last replication. The service store can transmit the incremental difference of metadata values to the write intake to store in a backend storage cluster.

In accordance with some embodiments, the service store can calculate an incremental difference of metadata values by maintaining a transaction log of changes to metadata values. The service store can periodically take a snapshot of a portion of the entries in the transaction log and ship the snapshot to the write intake.

In accordance with other embodiments, the service store can negotiate an incremental difference of metadata values with the write intake. For example, the write intake can advertise a set of references available in the storage cluster and the service store can calculate an incremental difference of metadata values not already described by the advertised set of references.

Similar to the service store, the storage cluster can be organized as a hierarchical data store, relational database, key-value data store, or other means of storing the formatted metadata values. The storage cluster can be organized as a plurality of storage units with particular high-availability or disaster recovery options not used by the service store. For example, the service store can be configured to recover from damage by recalculating the stored metadata values from the service data whereas the storage cluster can be configured to recover from damage by maintaining a spare storage unit in an active/passive configuration. As another example, the storage cluster can be configured with multiple storage units in an active/active configuration. In either of these examples, the storage cluster can synchronize storage units through log shipping or other means of transactionally coordinating data.

In step 303, authorization information is obtained from the one or more services. In accordance with an embodiment, an authorization runtime can scrape or receive security information regarding a first service instance. For example, the authorization runtime can periodically receive updates about user permissions to access service data for the service instance.

In accordance with an embodiment, the authorization runtime is configured with an accepted time range that allows the authorization runtime to make security decisions based on security information received within the limited accepted time range. The authorization runtime can make a synchronous request to a service instance to confirm user permissions for which security information is not available or is stale according to the accepted time range.

In step 304, metadata values from another cluster located in a different region are replicated to the local storage cluster. In accordance with an embodiment, an inter-regional replicator can asynchronously replicate one or more additional metadata values to the storage cluster from a second service instance that is remotely located in the other storage cluster. The inter-regional replicator can replicate metadata values between the storage cluster and a second, remote storage cluster, such as a storage cluster located in another geographic region.

In accordance with an embodiment, the inter-regional replicator can asynchronously replicate metadata values using a reliable messaging session between the two storage clusters. For example, the inter-regional replicator can transmit one or more messages containing the additional metadata values over the reliable messaging session. The reliable messaging session can be a durable session so as to support the delivery of the messages in an in-order and exactly-once fashion even when a session is temporarily lost, such as due to machine failure.

In accordance with some embodiments, the inter-regional replicator can perform bidirectional replication by computing the symmetric difference of a pair of storage clusters. The inter-regional replicator can repeatedly select metadata values in the symmetric difference to exchange between the storage clusters until the symmetric difference is empty.

In accordance with other embodiments, the inter-regional replicator can refrain from replicating a metadata value due to a property of the value. For example, a metadata value may have a property indicating that the value is governed by the European Union Data Protection Directive. Based on the presence of the property, the inter-regional replicator can refrain from replicating the metadata value outside of the EU.

In accordance with some embodiments, the inter-regional replicator can provide a version number, such as a timestamp, for the metadata value exchanges so as to avoid overwriting a newer version of a metadata value with an older version of a metadata value when a metadata value has changed.

In step 305, a query request is received for at least a portion of the metadata values stored in the cluster. In accordance with an embodiment, a query processor can issue the query request for a portion of the metadata values and a portion of the additional metadata values to a read intake. The query request can be based on matching one or more axes of the similarly structured data. For example, the query request can request the collection of metadata values across a variety of service instances and service regions that share a common property.

In step 306, a response is issued to the query based on the authorization info' nation and the metadata stored in the cluster. In accordance with an embodiment, the read intake can satisfy the query request based on the contents of the authorization runtime and storage cluster. The read intake can pass one or more metadata values retrieved from the storage cluster to the authorization runtime along with the identity of the user issuing the query request. The authorization runtime can determine whether the user is allowed to access the one or more metadata values.

In accordance with some embodiments, the read intake can treat the one or more metadata values passed to the authorization runtime as severable. The authorization runtime can determine that the user is allowed to access at least one of the one or more metadata values. Based on the determination, the read intake can return to the user the at least one of the metadata values that the authorization runtime determined that the user is allowed to access.

In accordance with other embodiments, the read intake may treat the one or more metadata values passed to the authorization runtime as inseverable. The authorization runtime can determine that the user is not allowed to access at least one of the metadata values. Based on the determination, the read intake can return to the user none of the metadata values.

In accordance with some embodiments, the system can further include a set of failsafe decouplers that can be used to temporarily suspend data synchronization. A failsafe decoupler can be included at one or more of: the ingester, the write intake, or the inter-regional replicator. A failsafe decoupler can automatically engage when a consistency error is detected on the write-side of the failsafe. For example, a failsafe decoupler for the write intake can engage when a consistency error is detected in the storage cluster, thereby preventing any changes coming from the service store from making the consistency error worse. The failsafe decoupler can automatically disengage once the consistency error is corrected.

To illustrate the functionality of a failsafe decoupler, a service data store can be periodically inspected for validation errors in the format of the data stored therein. When such validation errors are detected, it can be assumed that there is a problem with that particular data store and the failsafe decoupler can automatically engage to halt the propagation of information from the data store in order to prevent other components from being affected by this problem. In accordance with an embodiment, the decoupler detecting that one or more validation errors have been detected in the source data store and in response temporarily cut off the link to the next data store. In accordance with other embodiments, the failsafe can cut off propagation to the ingester, the write intake, the inter-regional replicator, or any other linkage point in the system where replication is being performed. This can also include notifying an administrator or other technician that an error has been detected and that data replication has been suspended at a particular communication link in the system. Once the administrator takes the corrective action to address the problem, the communication link can be restored and the data replication can resume.

Figure 4:
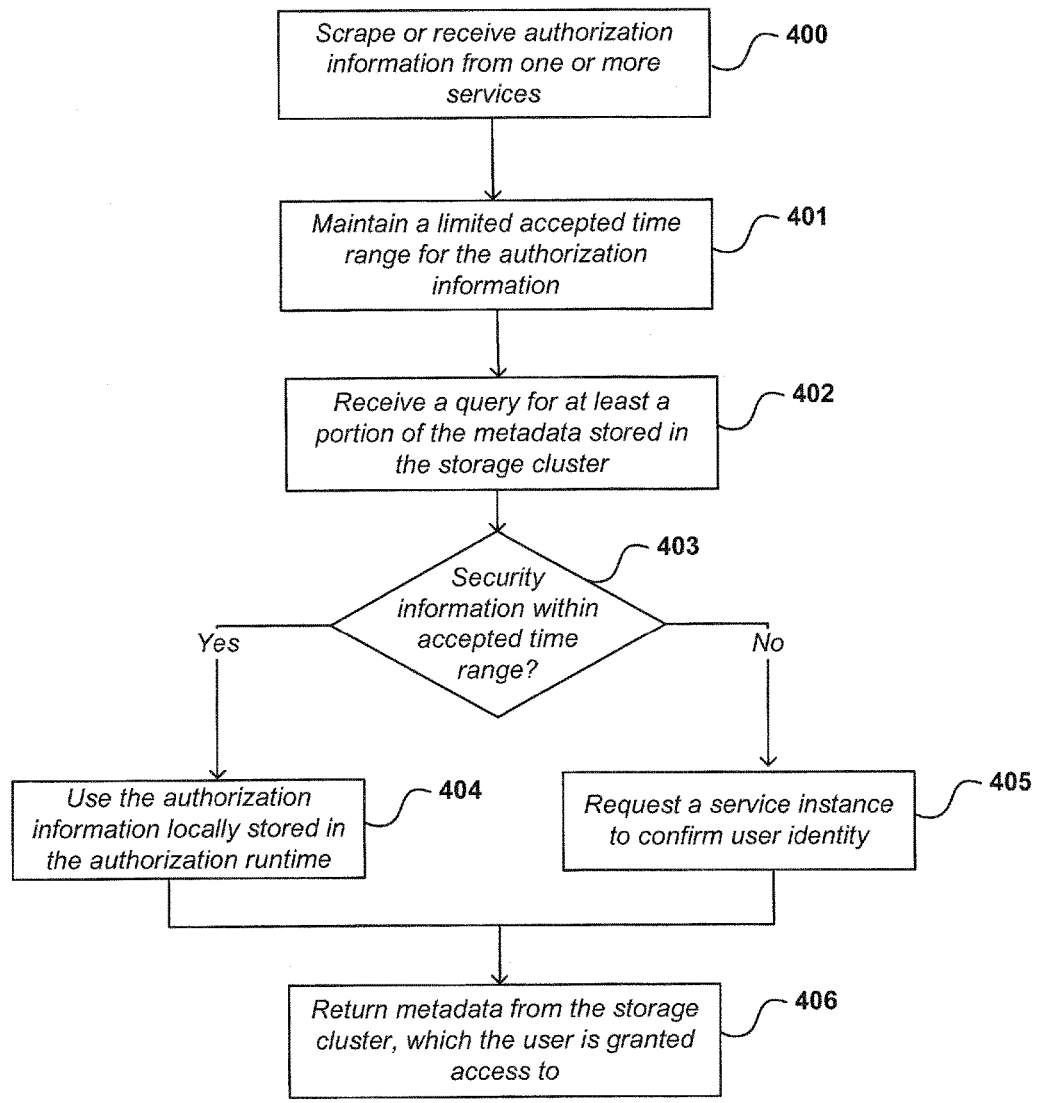
FIG. 4 illustrates an example process that can be utilized in conjunction with the authorization runtime, in accordance with various embodiments.

FIG. 4 illustrates an example process that can be utilized in conjunction with the authorization runtime, in accordance with various embodiments. As illustrated in step 400, the authorization runtime can scrape or receive authorization information from one or more services. For example, the authorization runtime can periodically receive updates about user permissions to access service data for the service instance. Additionally, the authorization runtime can maintain a limited accepted time range for the authorization information, as shown in step 401. The time range can be used by the authorization runtime to determine whether the authorization information stored locally at the storage cluster is sufficiently fresh to be used to control access to service metadata.

In step 402, a query request can be received for the service metadata. For example, a read intake can pass one or more metadata values retrieved from the storage cluster to the authorization runtime along with the identity of the user issuing the query request. The authorization runtime can determine whether the user is allowed to access the one or more metadata values. In step 403, the authorization runtime can determine whether the authorization information is within the accepted time range. If it is within the accepted time range, the authorization runtime uses the authorization information to control user access to the service metadata (step 404). If the authorization information is not within the accepted time range, the authorization runtime can make a synchronous request to a service instance to confirm user permissions for which security information is not available or is stale according to the accepted time range (step 405).

In step 406, the query request can be satisfied based on the contents of the authorization runtime and storage cluster. In accordance with an embodiment, the metadata values passed to the authorization runtime can be treated as severable and the user can be provided access to only the subset of the requested metadata values that the authorization runtime has granted access to. Alternatively, if the metadata values are treated as being inseverable, in which case, the user would be granted access to all or none of the requested metadata values.

Figure 5:
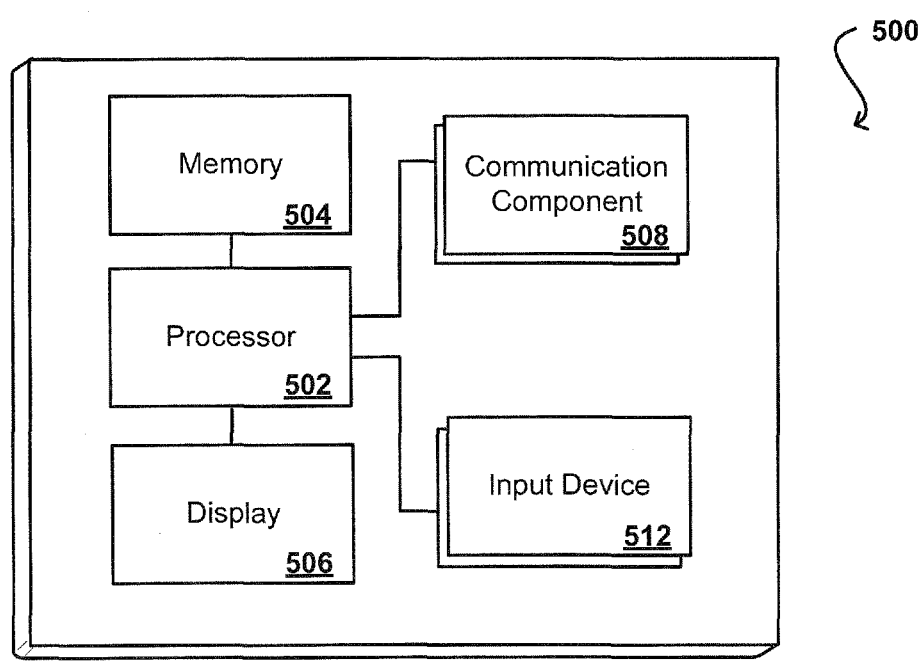
FIG. 5 illustrates example components of a client computing device in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 512 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more communication components 508, such as a Wi-Fi, Bluetooth, RF, wired, or wireless communication system. The device in many embodiments can communicate with a network, such as the Internet, and may be able to communicate with other such devices.

Figure 6:
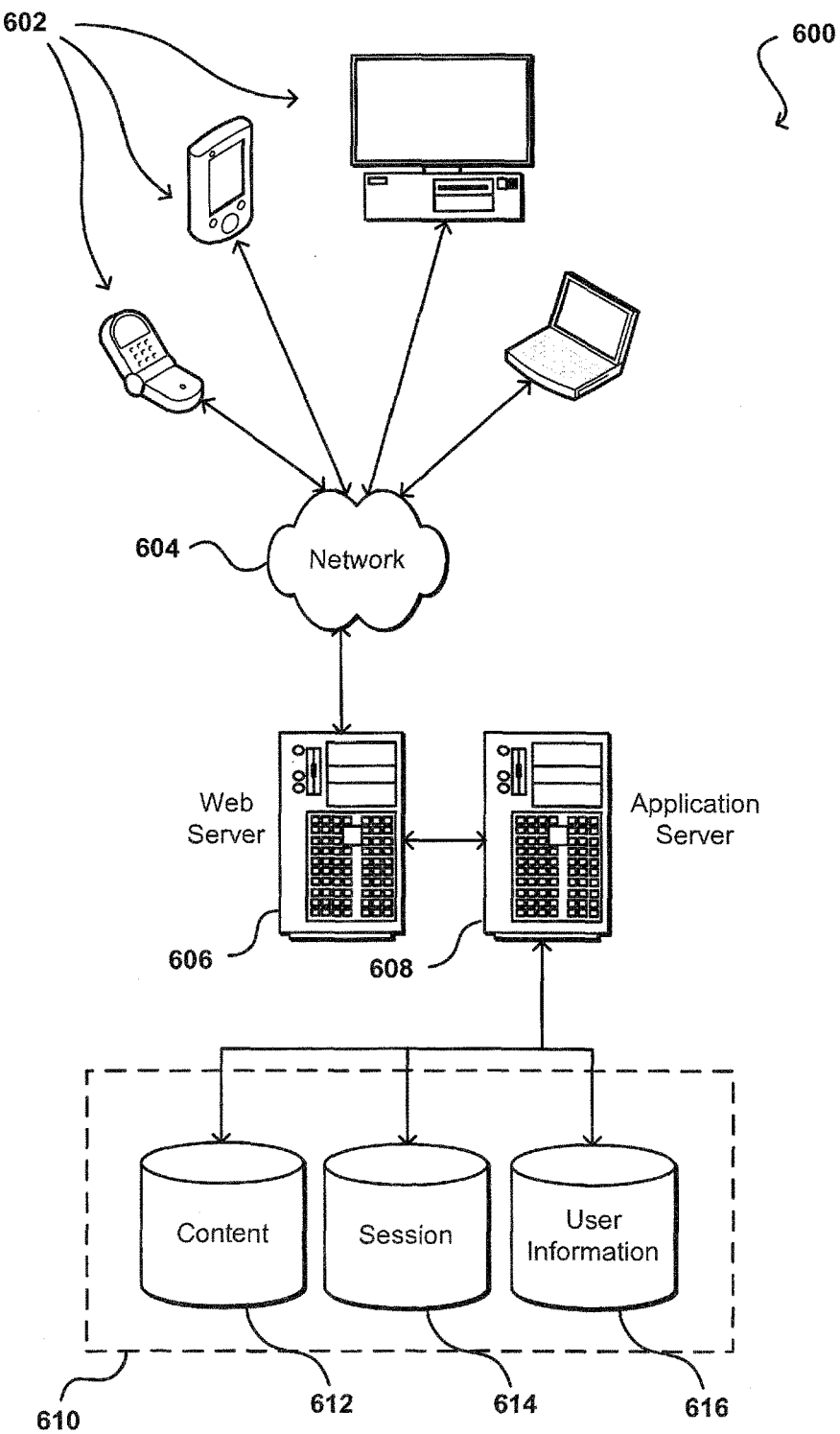
FIG. 6 illustrates an environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for wide scale replication of service metadata, the method comprising:
    ingesting service metadata associated with one or more services that are located at a first geographical region and storing the service metadata into a service store at the first geographical region;
    formatting the service metadata to have a structure associated with one or more metadata values stored in the service store;
    replicating, over a local area network connection in the first geographical region, at least a portion of the service metadata to a first storage cluster at the first geographical region;
    receiving, to the first storage cluster, a replication of at least a portion of service metadata from a second storage cluster at a second geographical region that is remotely located with respect to the first storage cluster, the first storage cluster communicating with the second storage cluster over a wide area network connection that enables communication across the first and second geographical regions;
    obtaining a set of authorization information from the one or more services, the authorization information controlling user access to the one or more services;
    receiving a service metadata query request at the first storage cluster; and
    employing the set of authorization information to issue a response to the service metadata query request, the response containing at least a portion of the service metadata stored in the first storage cluster.

2. The computer-implemented method of claim 1, wherein ingesting the service metadata further includes:
    scraping a service instance for metadata values by periodically invoking the one or more services on behalf of at least one user to retrieve the metadata values; or
    operating a service endpoint that the one or more services periodically call providing a list of changes to the service metadata.

3. The computer-implemented method of claim 1, wherein obtaining the authorization information further includes performing at least one of the following:
    scraping a service instance for the authorization information by periodically invoking the one or more services on behalf of at least one user to retrieve the authorization information; or
    periodically receiving the authorization information from the service instance.

4. The computer-implemented method of claim 1, wherein receiving a service metadata query request further includes:
    receiving a query that requests a portion of the service metadata stored in the first storage cluster and a portion of the service metadata stored in the second storage cluster that is remotely located with respect to the first storage cluster.

5. A computer-implemented method for wide scale replication of service metadata, the method comprising:
    incorporating metadata associated with a first service instance of a web service at a first geographical region, the incorporating being performed by a second web service at a second geographical region that is remote from the first service instance;
    obtaining a set of authorization information from the first service instance, the authorization information controlling user access to at least the first service instance;
    receiving, to the first geographical region, a replication of at least a portion of metadata stored in the second geographical region, the at least the portion of metadata associated with a second service instance of the second web service running independently in the second geographical region that is remote from the first geographical region, the first service instance of the web service being a same type of service as the second service instance of the second web service;
    receiving a metadata retrieval request to the first geographic region; and
    determining whether to grant access to the metadata stored in the first geographic region by using the authorization information and responding to the metadata retrieval request.

6. The computer-implemented method of claim 5, wherein incorporating the metadata into the first geographical region further includes:
    formatting the metadata to be similarly structured with other metadata values stored in the first geographic region.

7. The computer-implemented method of claim 5, wherein incorporating the metadata further includes:
    scraping the first service instance for metadata values by periodically invoking the first service instance on behalf of at least one user to retrieve the metadata values.

8. The computer-implemented method of claim 5, wherein incorporating the metadata further includes:
    operating a service endpoint that the first service instance periodically calls providing a list of changes to the metadata.

9. The computer-implemented method of claim 5, wherein obtaining the authorization information further includes:

scraping the first service instance for the authorization information by periodically invoking the first service instance on behalf of at least one user to retrieve the authorization information.

10. The computer-implemented method of claim 5, wherein obtaining the authorization information further includes:
periodically receiving the authorization information from the first service instance.

11. The computer-implemented method of claim 5, further comprising:
receiving a query that requests a portion of the metadata stored in the first geographic region and a portion of the metadata stored in the second geographic region and replicated to the first geographic region.

12. The computer-implemented method of claim 11, further comprising:
satisfying the query based on the authorization information and the metadata stored in the first geographic region.

13. The computer-implemented method of claim 5, further comprising:
maintaining a limited accepted time range for the authorization information, wherein if the limited accepted time range is expired upon receiving a query for the metadata, the one or more services are contacted to confirm user permissions.

14. The computer-implemented method of claim 5, wherein receiving the replication of at least a portion of metadata from the second geographic region further includes:
computing a symmetric difference between at least a portion of metadata from the first geographic region and the at least a portion of metadata from the second geographic region;
selecting at least one metadata value from the second geographic region in the symmetric difference; and
replicating the selected metadata values to the first geographic region asynchronously.

15. The computer-implemented method of claim 5, wherein receiving the replication of at least a portion of the metadata from the second geographic region further includes:
refraining from replicating a metadata value due to a property of the metadata value.

16. The computer-implemented method of claim 5, wherein determining whether to grant access to the metadata further includes:
determining that a user is allowed to access only a subset of metadata values requested by the metadata retrieval request; and
filtering out the metadata values that the user is not allowed to access upon responding to the metadata retrieval request.

17. A system for wide-scale replication of service metadata, the system comprising:
one or more processors and a storage memory containing instructions that cause the one or more processors to implement:
an ingester that scrapes or receives service metadata from one or more services and stores the service metadata into a service store at a first geographical region, the service metadata associated with at least a first service instance of a web service in the first geographical region;
a first storage cluster at the first geographical region that stores at least a portion of the service metadata replicated from the service store;
an inter-regional replicator that replicates at least a portion of additional service metadata from a second storage cluster at a second geographical region that is remotely located with respect to the first storage cluster and communicates with the first storage cluster over a wide area network connection, the additional service metadata associated with a second service instance of the web service running independently in a second geographical region, the wide area connection enabling communication across the first and second geographical regions; and
an authorization runtime that obtains a set of authorization information from the one or more services and employs the authorization information to control user access to the service metadata stored in the first storage cluster.

18. The system of claim 17, wherein the ingester formats the service metadata to be similarly structured with other metadata values stored in the service store.

19. The system of claim 17, further comprising:
a read intake that receives a query request for a portion of the service metadata stored in the first storage cluster and the portion of the additional service metadata replicated from the second storage cluster, wherein the query request is based on matching one or more axes of similarly structured data.

20. The system of claim 19, wherein the read intake satisfies the query request based on contents in the authorization runtime and the first storage cluster, wherein the read intake passes one or more metadata values retrieved from the first storage cluster to the authorization runtime along with an identity of a user issuing the query request, and wherein the authorization runtime determines that the user is allowed to access only a subset of the metadata values requested by the query request and filters out the metadata values which the user is not allowed to access upon responding to the query request.

21. The system of claim 17, further comprising:
one or more failsafe decouplers included at one or more of: the ingester, a write intake to the first storage cluster, or the inter-regional replicator, wherein a failsafe decoupler automatically engages to temporarily suspend data synchronization when a consistency error is detected on a write-side of the failsafe.

22. A non-transitory computer readable storage medium storing one or more sequences of instructions executed by one or more processors to perform a set of steps comprising:
incorporating metadata associated with a first service instance of a web service at a first geographical region, the incorporating being performed by a second web service that is remote from the first service instance;
obtaining a set of authorization information from the first service instance, the authorization information controlling user access to at least the first service instance;
receiving, to the first geographical region, a replication of at least a portion of metadata stored in a second geographical region, the at least the portion of metadata associated with a second service instance of the second web service running independently in the second geographical region that is remote from the first geographical region, the first service instance of the web service being a same type of service as the second service instance of the second web service;

receiving a metadata retrieval request to the first geographical region; and determining whether to grant access to the metadata stored in the first geographic region by using the authorization information and responding to the metadata retrieval request.

23. The non-transitory computer readable storage medium of claim 22, wherein incorporating the metadata into the first geographical region further includes:

formatting the metadata to be similarly structured with other metadata values stored in the first geographical region.

24. The non-transitory computer readable storage medium of claim 22, wherein incorporating the metadata further includes:

scraping a service instance for metadata values by periodically invoking one or more services on behalf of at least one user to retrieve the metadata values; or operating a service endpoint that the one or more services periodically call providing a list of changes to the metadata.

25. The non-transitory computer readable storage medium of claim 22, wherein obtaining the authorization information further includes performing at least one of the following:

scraping a service instance for the authorization information by periodically invoking one or more services on behalf of at least one user to retrieve the authorization information; or periodically receiving the authorization information from the service instance.

26. The non-transitory computer readable storage medium of claim 22, further comprising instructions for:

receiving a query that requests a portion of the metadata stored in the first geographical region and a portion of the metadata stored in the second geographical region and replicated to the first geographical region.

27. The non-transitory computer readable storage medium of claim 26, further comprising instructions for:

satisfying the query based on the authorization information and the metadata stored in the first geographical region.

* * * * *